Jan. 4, 1949. S. V. POLEVOY 2,458,298
FISHING REEL
Filed April 11, 1946

INVENTOR.
Stephen V. Polevoy
BY John P. Chandler
his Attorney

Patented Jan. 4, 1949

2,458,298

UNITED STATES PATENT OFFICE 2,458,298

FISHING REEL

Stephen V. Polevoy, New York, N. Y.

Application April 11, 1946, Serial No. 661,427

5 Claims. (Cl. 242—84.4)

This invention relates to fishing reels, and has for its principal object the provision of a structurally improved reel having a minimum of parts and which can be readily taken apart for cleaning and replacing elements of the device.

Another object of the invention is to provide a reel having a novel housing which is simple and inexpensive to construct, and which is provided with one removable end plate which, when removed through the manipulation of a single cap screw, permits complete access to all operative parts of the device. The housing of the fishing reel of the present invention is a unitary, streamlined two-piece affair which completely eliminates the need for pillars or other interconnecting elements between the tail plate and the head plate. Moreover, the construction eliminates the need for spaced head plates of conventional reels, between which the gears, pinions and other operative parts are normally located.

The housing includes a generally cylindrical casing provided with a fixed tail plate which may, if desired, be formed integrally with the casing, and a removable head plate. If a level winding feature is to be included, the casing may be substantially pear-shaped in transverse section, and if this feature is eliminated, as in the case of a salt-water reel, the casing may be substantially circular in transverse section. In either event, the casing forms an effective spacing element for mounting the tail and end plates in their spaced, aligned relationship. Such casing may be formed with a single opening extending over a considerable portion of its periphery, through which the line passes.

Another object of the invention is to provide an improved housing for a fishing reel which permits the employment of a larger spool than is possible in conventional housings of comparable size. This larger spool enables more line to be carried without increasing the overall dimensions of the reel.

A further object of the invention is the provision of an improved click mechanism for fishing reels.

Yet another object of the invention is to provide a novel reel having a free spooling arrangement for casting purposes.

Figure 1:
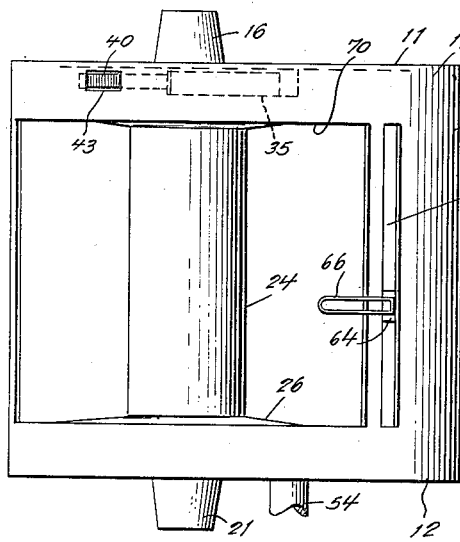
Fig. 1 is a top plan view of a fishing reel embodying the present invention.

The reel housing comprises a casing 10, a tail plate 11, and a head plate 12. The casing is substantially circular over the major portion of its periphery, and is further provided with an extension portion 13 in which the level winding mechanism is housed, thus giving the housing a substantially pear-shaped contour when viewed from either end. If desired, casing 10 and tail plate 11 may be drawn or otherwise formed from a single piece of sheet metal, although, if desired, the tail plate may be separately formed and suitably secured to the casing 10. Head plate 12 is removable from the casing and may be formed with a peripheral groove 14 which receives the open marginal edge of the casing.

A cap nut 16 is rigidly mounted concentrically of the circular portion of tail plate 11, such nut having a threaded aperture 17 which receives a reduced, threaded terminal portion 18 of a fixed shaft 19. At its opposite end shaft 19 is similarly threaded, as shown at 20, and receives an internally-threaded cap nut 21 which securely mounts head plate 12 on the casing. Thus, to open the casing it is merely necessary to remove cap nut 21, and the internal operative parts of the device are then readily accessible.

Figure 2:
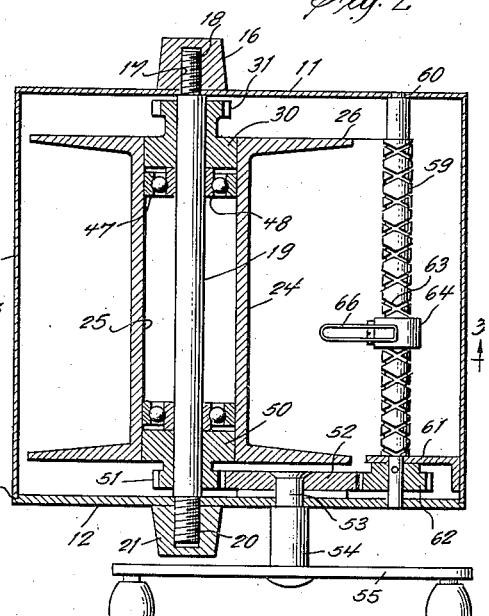
Fig. 2 is a longitudinal section taken on line 2—2 of Fig. 3.

Spool 24 is provided with an axial bore 25 and annular end walls 26. It will be seen, particularly from Fig. 2, that the spool occupies the major area within the housing, and consequently a larger spool may be employed for a given size of casing than in conventional reels. A bushing 30 is force-fitted in one end of the spool, and there may be formed integrally with such bushing a ratchet pinion 31 which forms part of the click mechanism. The remaining portion of the click mechanism is mounted on the inner surface of tail plate 11 and comprises a generally flat spring 35 mounted on such plate at one end thereof, as shown at 36. Substantially midway between the ends of such flat spring a generally V-shaped pawl 37 is secured. The spring is mounted at 36 so as to normally cause pawl 37 to engage ratchet pinion 31, as shown in Fig. 2.

Figure 3:
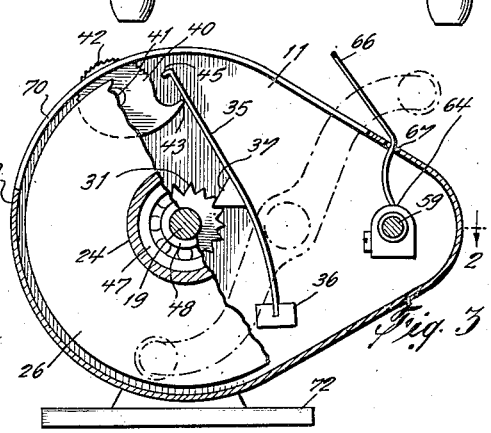
Fig. 3 is a transverse section taken on line 3—3 of Fig. 2.

The following means are provided for holding the pawl free of the ratchet pinion. A manually rotatable wheel 40 is journalled at 41 on tail plate 11, such wheel being knurled at 42. The knurled portion extends through an opening 43 in casing 10. The wheel is further formed with a cam portion 43 which may engage the free end of spring 35 and thus hold the pawl free of the ratchet when desired. Counterclockwise movement of cam portion 43, when viewed as in Fig. 3, is limited by an inturned end 45 of the spring.

In order to reduce friction between the spool and the shaft, the spool may further be provided adjacent each end thereof with ball-bearing elements including an outer race 47 which is forcefitted within bore 25, and an inner race 48 which is carried on shaft 19. At its opposite end spool 24 is provided with a bushing 50 which may also carry a driven pinion 51. This pinion is driven by a speed-multiplying gear 52 carried on a shaft 53 which is journalled in a boss 54 rigidly mounted on the exterior of head plate 12. At its opposite end shaft 53 carries the usual crank 55.

Figure 4:
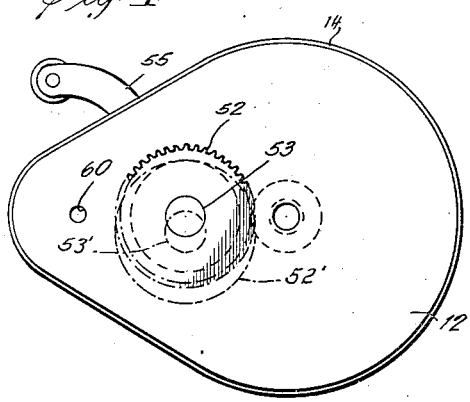
Fig. 4 is an elevation of the inner surface of the head plate, the view further showing the modified free-spooling arrangement.

A modification of the invention is shown in Fig. 4 wherein the boss forming a bearing for shaft 53 is so arranged as to permit movement of the shaft in a direction perpendicular to a line drawn between the axes of pinions 51 and 62. This permits gear 52 to move from the position shown in full lines in Fig. 4 to the position indicated by broken line 52', and thus permits free rotation of the spool.

The level winding mechanism may comprise a shaft 59 which is journalled at one end thereof for free rotative movement in tail plate 11, as shown at 60. Adjacent its opposite end, a bearing member 61 mounted on casing 10 is provided. Adjacent the outer terminal of shaft 55 a driven pinion 62 is keyed, such pinion being engaged by driving gear 52. Over the major portion of its length, shaft 59 is provided with two-way helical recesses 63. A carriage 64 mounted on the shaft is provided with a pin (not shown) extending into the recess. It will thus be apparent that as shaft 63 rotates, carriage 64 traverses back and forth on the shaft. Also mounted on the carriage is a wire loop 66 which passes through a narrow longitudinal slot 67 in the upper wall of extension 13.

Casing 10 is further provided with a second opening 70 of substantially the same length as opening 67, opening 70, however, extending over the greater portion of the upper periphery of such casing. On its lower surface casing 10 is provided with the usual clip 72 which is secured to the fishing rod (not shown).

Figure 6:
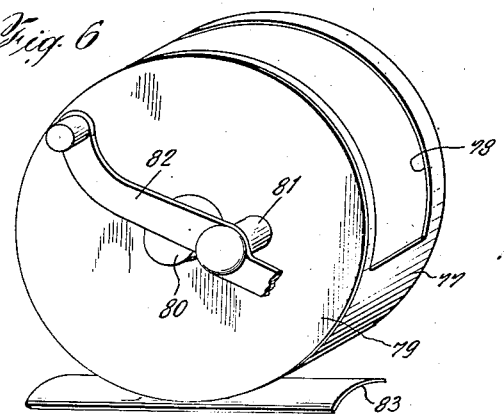
Fig. 6 is a perspective view of a modified form of the reel.
Figure 5:
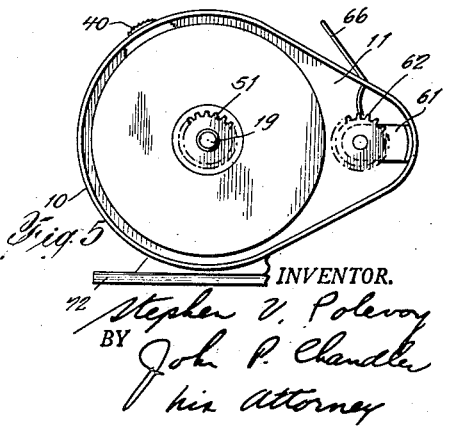
Fig. 5 is a side elevation of the reel with the head plate removed.

In the modified reel shown in Fig. 6, the extension 13 of the casing is omitted, the casing 77 in this instance being substantially circular. The casing is further provided with a single opening 78 extending substantially one-half the periphery thereof. A head plate 79 is mounted at the outer end of the casing and is secured thereto by means of cap nut 80. Also mounted on the casing is the boss 81 which forms a journal for a shaft (not shown) to which is secured the crank 82. A clip 83 is mounted on the lower surface of the casing.

While three forms or embodiments of the invention have been shown and described herein for illustrative purposes, and the construction and arrangement incidental to three specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. A fishing reel comprising a generally cylindrical casing having a line opening extending over a portion of its outer periphery and being provided with a fixed tail plate at one end thereof, a removable head plate at the opposite end thereof, a spool, a shaft fixed to the tail plate supporting the spool for rotative movement, the outer end of the shaft projecting through the head plate, a click mechanism positioned between one end of the spool and the tail plate, driving means positioned between the other end of the spool and the head plate, and a nut at the outer end of the shaft for retaining the head plate in place.

2. A fishing reel comprising a generally cylindrical casing having a line opening extending over a portion of its outer periphery and being provided with a fixed tail plate at one end thereof, a removable head plate at the opposite end thereof, a spool, a shaft fixed to the tail plate supporting the spool for rotative movement, the outer end of the shaft projecting through the head plate, driving means positioned between one end of the spool and the head plate, and a click mechanism positioned between one end of the spool and the tail plate, said click mechanism comprising a ratchet pinion carried by the spool, a pawl support carried on the inner surface of the tail plate, a pawl carried thereby which normally engages the pinion, means disengaging the pawl from the pinion, and means at the outer end of the shaft for retaining the head plate in place.

3. A fishing reel comprising a generally cylindrical casing having a line opening extending over a portion of its outer periphery and being provided with a fixed tail plate at one end thereof, a removable head plate at the opposite end thereof, a spool, a shaft supporting the spool for rotative movement, a click mechanism positioned between one end of the spool and the tail plate, and means at the outer end of the shaft for retaining the head plate in place, said click mechanism comprising a ratchet pinion carried by the reel, a pawl normally engaging the pinion, an elongated spring-like support for the pawl which is secured at one end thereof to the inner surface of the tail plate, and manually actuable means contacting the other end of the pawl support for moving the pawl out of engagement with the pinion.

4. A fishing reel comprising a generally cylindrical casing having a line opening extending over a portion of its outer periphery and being provided with a fixed tail plate at one end thereof, a removable head plate at the opposite end thereof, a spool, a shaft fixed to the tail plate supporting the spool for rotative movement, the outer end of the shaft projecting through the head plate, a nut at the outer end of the shaft for retaining the head plate in place, a level winding mechanism extending longitudinally of the casing generally parallel with said shaft, a click mechanism positioned between one end of the spool and the tail plate, and a manually rotatable driving gear positioned between the other end of the spool and the head plate for rotating the spool and the level winding mechanism.

5. A fishing reel comprising a housing and a spool journalled therein, the housing including a generally cylindrical casing provided with a fixed tail plate at one end thereof and a removable head plate at its opposite end, the casing having an opening for the fishing line extending the major portion of its length and over a portion of its periphery, a shaft rigidly mounted on the tail plate, the spool being journalled on such shaft, a click mechanism comprising a ratchet pinion carried at one end of the spool, a spring mounted at one end thereof on the inner surface of the tail plate, a pawl carried by the spring and normally engaging the pinion, and means for holding the pawl free of the ratchet pinion, a driven pinion at the other end of the spool, a driving gear provided with a crank journalled in the head plate and arranged to drive the pinion and the spool, the fixed shaft projecting through the head plate, and a cap screw at the outer end of the shaft to retain the head plate in place.

STEPHEN V. POLEVOY.

REFERENCES CITED

The following references are of record in the file of this patent:

UNITED STATES PATENTS

| Number | Name | Date |
|---|---|---|
| 520,607 | McGregor | May 29, 1894 |
| 1,592,287 | Schmid | July 13, 1926 |
| 1,844,980 | Russell | Feb. 16, 1932 |
| 1,901,091 | Fawcett | Mar. 14, 1933 |
| 2,366,920 | McMahon | Jan. 9, 1945 |